US012671338B2

(12) United States Patent
Javora et al.

(10) Patent No.: US 12,671,338 B2
(45) Date of Patent: Jun. 30, 2026

(54) POWER CONVERSION SYSTEM

(71) Applicant: ABB Schweiz AG, Baden (CH)

(72) Inventors: Radek Javora, Hrusovany u Brna (CZ); Carlos David Martinez Nieto, Tallinn (EE); Andreas Brandt, Düsseldorf (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/782,756

(22) Filed: Jul. 24, 2024

(65) Prior Publication Data

US 2024/0380327 A1 Nov. 14, 2024

Related U.S. Application Data

(63) Continuation of application No. PCT/EP2023/050533, filed on Jan. 11, 2023.

(30) Foreign Application Priority Data

Jan. 24, 2022 (EP) ..................................... 22152992

(51) Int. Cl.
*H02M 3/24* (2006.01)
*H02J 3/007* (2026.01)
*H02J 3/36* (2026.01)

(52) U.S. Cl.
CPC ............... *H02M 3/24* (2013.01); *H02J 3/007* (2020.01); *H02J 3/36* (2013.01)

(58) Field of Classification Search
None
See application file for complete search history.

(56) References Cited

U.S. PATENT DOCUMENTS

2020/0136370 A1* 4/2020 Loder ....................... H02J 3/36
2021/0203165 A1 7/2021 Erokhovets
(Continued)

FOREIGN PATENT DOCUMENTS

CN 110126658 A * 8/2019 ............. B60L 53/20
CN 111900884 A 11/2020
(Continued)

OTHER PUBLICATIONS

Kehler et al., "Auxiliary Power Supply for Solid State Transformers," *2016 IEEE International Conference on Electronics, Circuits and Systems (ICECS)*, 193-196 (Dec. 11-14, 2016).
(Continued)

*Primary Examiner* — Menatoallah Youssef
*Assistant Examiner* — Joel Barnett
(74) *Attorney, Agent, or Firm* — Fitch Even Tabin & Flannery LLP

(57) ABSTRACT

A power conversion system includes a high voltage (HV) switchgear; a solid-state transformer; and a low voltage (LV) switchgear. The HV switchgear connects to and disconnects from a HV or medium voltage (MV) network. The HV switchgear connects to an input of the solid-state transformer. The solid-state transformer comprises a first module and a second module. The first module converts a HV alternating current (AC) signal into a HV direct current (DC) signal. The second module connects to an output of the first module and converts the HV DC signal from the first module into at least one LV DC signal. The second module comprises at least one sub-module that converts the HV DC signal from the first module into a LV DC signal. The LV switchgear connects to an output of the solid-state transformer.

17 Claims, 3 Drawing Sheets

(56)             References Cited

U.S. PATENT DOCUMENTS

| | | | |
|---|---|---|---|
| 2022/0269325 A1* | 8/2022 | Huang | H02M 3/155 |
| 2022/0348100 A1* | 11/2022 | Keister | H02M 3/33573 |
| 2023/0352934 A1* | 11/2023 | Steimer | H02J 1/102 |
| 2024/0088798 A1* | 3/2024 | Shuai | H02M 3/335 |

FOREIGN PATENT DOCUMENTS

| | | | |
|---|---|---|---|
| CN | 112072719 A | 12/2020 |
| CN | 112165083 A | 1/2021 |
| EP | 3985823 A1 | 4/2022 |
| WO | WO 2013/002438 A1 | 1/2013 |

OTHER PUBLICATIONS

Xie et al., "A Current Residual-Based Open-Circuit Fault Diagnosis Method for Cascaded H-Bridge Multilevel Converters," *2019 IEEE 10th International Symposium on Power Electronics for Distributed Generation Systems (PEDG)*, 793-799 (Jun. 3-6, 2019).
European Patent Office, International Search Report in International Patent Application No. PCT/EP2023/050533, 4 pp. (Mar. 17, 2023).
European Patent Office, Written Opinion in International Patent Application No. PCT/EP2023/050533, 7 pp. (Mar. 17, 2023).
European Patent Office, Extended European Search Report in European Patent Application No. 22152992.8, 10 pp. (Jun. 23, 2022).

* cited by examiner

-PRIOR ART-

POWER CONVERSION SYSTEM

CROSS-REFERENCE TO RELATED APPLICATIONS

The instant application claims priority to International Patent Application No. PCT/EP2023/050533, filed Jan. 11, 2023, and to European Patent Application No. 22152992.8, filed Jan. 24, 2022, each of which is incorporated herein in its entirety by reference.

FIELD OF THE DISCLOSURE

The present invention relates to a power conversion system.

BACKGROUND OF THE INVENTION

In a general aspect, power conversion requires there to be several independent devices involved. Power comes from a medium voltage (MV) or high voltage (HV) network to a power transformer, which converts the voltage to a low voltage (LV) level, which is still at a frequency of a power system that provided the power. This LV alternating current (AC) output is then converted to a LV direct current (DC) output and such a LV DC signal is then further used for LV applications.

A conventional layout of HV or MV AC to LV DC power conversion is shown in FIG. 1. Such a low frequency (typically within 2-200 Hz) power transformer can also provide galvanic insulation between the LV DC network/application and the HV/MV grid for safety purposes. Nevertheless, this bulky power transformer occupies a large space within an overall conversion system, consumes a lot of raw materials, has significant weight, and creates power losses.

BRIEF SUMMARY OF THE INVENTION

It would be advantageous to have an improved technique to convert power from HV or MV AC to LV DC. In a first aspect, there is provided a power conversion system, comprising a high voltage "HV" switchgear, a solid-state transformer, and a low voltage "LV" switchgear. The HV switchgear is configured to connect to a high voltage or medium voltage "HV or MV" network and disconnect from the HV or MV network. The HV switchgear is configured to connect to an input of the solid-state transformer. The solid-state transformer comprises a first module and a second module. The first module is configured to convert a high voltage alternating current "HV AC" signal into a high voltage direct current "HV DC" signal. The second module is configured to connect to an output of the first module and convert the HV DC signal from the first module into at least one low voltage direct current "LV DC" signal. The second module comprises at least one sub-module. Each sub-module (or the sub-module if there is only one) is configured to convert the HV DC signal from the first module into a LV DC signal. The LV switchgear is configured to connect to an output of the solid-state transformer. The LV switchgear is configured to connect to a plurality of applications or devices and disconnect from the plurality of applications or devices. The LV switchgear comprises a plurality of switches, and each switch is connected to an application or device. The LV switchgear is configured to connect the at least one LV DC signal from the second module to one or more of the plurality of applications or devices.

BRIEF DESCRIPTION OF THE SEVERAL VIEWS OF THE DRAWING(S)

DETAILED DESCRIPTION OF THE INVENTION

Figure 1:
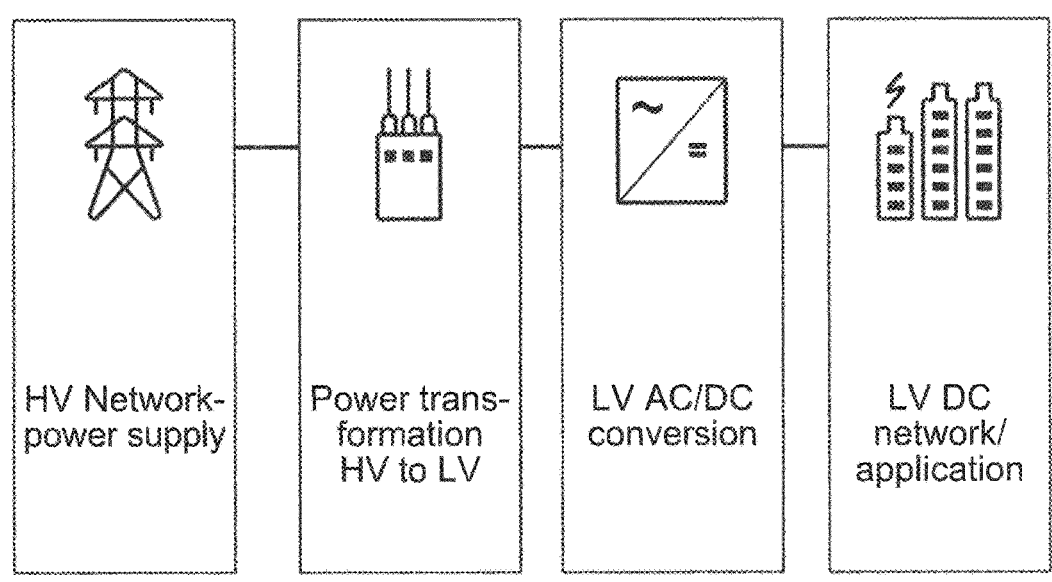
FIG. 1 is a conventional layout of HV or MV AC to LV DC power conversion.

FIGS. 2-5 relate to a new power conversion system 1. The power conversion system 1 comprises a high voltage (HV) switchgear 3, a solid-state transformer 4, and a low voltage (LV) switchgear 5. The HV switchgear 3 is configured to connect to a high voltage or medium voltage (HV or MV) network 2 and disconnect from the HV or MV network 2. The HV switchgear 3 is configured to connect to an input of the solid-state transformer 4. The solid-state transformer 4 comprises a first module 11 and a second module 12. The first module 11 is configured to convert a high voltage alternating current (HV AC) signal into a high voltage direct current (HV DC) signal. The second module 12 is configured to connect to an output of the first module 11 and convert the HV DC signal from the first module 11 into at least one low voltage direct current (LV DC) signal. The second module 12 comprises at least one sub-module 13. Each sub-module 13, or the sub-module 13, is configured to convert the HV DC signal from the first module 11 into a LV DC signal. The LV switchgear 5 is configured to connect to an output of the solid-state transformer 4. The LV switchgear 5 is configured to connect to a plurality of applications or devices 6 and disconnect from the plurality of applications or devices 6. The LV switchgear 5 comprises a plurality of switches, and each switch is connected to an application or device (6). The LV switchgear 5 is configured to connect the at least one LV DC signal from the second module 12 to one or more of the plurality of applications or devices 6 (there can also just be direct connection to these devices or applications without devices in between).

It is to be noted that reference to a "switch" with respect to the LV switchgear comprising a plurality of switches, and where each switch is connected to an application or device, means a switch in terms of a switch in terms of any type of switch and/or a circuit breaker and/or a fuse or fuses.

Also, plurality of applications or devices 6 can be for example data center(s), windmill(s), railway(s), and photovoltaic grid connection(s). These are just exemplary applications and devices, and others can be connected to and disconnected from. In general, these applications or devices 6 could be related to energy consumption, generation and/or storage.

In an example, the system further comprises a housing enclosure within which the HV switchgear 3, the solid-state transformer 4, and the LV switchgear 5 are arranged.

In an example, the system further comprises a housing enclosure within which at least the solid-state transformer 4 is arranged.

In an example, the system is a three-phase system or station.

In an example, the solid-state transformer 4 is built out of three single-phase units configured to be operated independently.

In an example, the system is configured to receive power from at least one auxiliary power supply 7 for control and/or communication circuits.

In an example, the system comprises a control system 8 for control, data acquisition, and communication functionality.

In an example, the first module 11 is configured to convert a high voltage direct current "HV DC" signal into a high voltage alternating current "HV AC", in addition to being able to convert a high voltage alternating current (HV AC) signal into a high voltage direct current (HV DC) signal.

Thus, the first module 11 can operate in forwards and backwards modes.

According to an example, each sub-module 13 comprises a DC to AC converter 14, a medium frequency transformer 15 and an AC to DC converter 16. The DC to AC converter 14 is configured to convert the HV DC signal from the first module 11 into a HV AC signal. The medium frequency transformer 15 is configured to convert the HV AC signal from the DC to AC converter 14 into a LV AC signal. The AC to DC converter 16 is configured to convert the LV AC signal from the medium frequency transformer 15 into the LV DC signal.

According to an example, each sub-module 13 can be connected and scaled in parallel to provide redundancy or to add power capacity as needed based to one or more of the plurality of applications or devices 6.

According to an example, the second module 12 comprises a plurality of sub-modules 13. The LV switchgear is configured to connect the LV DC signal from each sub-module 13 to one or more of the plurality of applications or devices 6.

According to an example, the second module 12 comprises a plurality of sub-modules 13. The LV switchgear is configured to connect the LV DC signal from each sub-module (13) to the plurality of applications or devices (6).

Thus, a LVDC signal from one sub-module can be connected to one application or device, to two applications or devices, or to all the applications or devices. Thus, every sub-module could be connected to one or more different applications or devices.

According to an example, the HV switchgear 3 comprises a plurality of protection or safety device configured to prevent excessive signals from the HV or MV network 2 or fault signals from being exposed to the solid-state transformer 4 or to personnel.

Thus, the HV switchgear 3 comprises at least one protection device that can prevent the faulty signals harming the solid-state transformer 4 or personnel.

According to an example, the LV switchgear 5 is configured to connect to two or more applications or devices 6 of the plurality of applications or devices 6 to connect the two or more applications or devices 6 to each other.

According to an example, the LV switchgear 5 is configured to disconnect power from/to the solid-state transformer 4.

According to an example, the LV switchgear 5 is configured to connect the two or more applications or devices 6 to each other.

Thus, the switchgear 5 can disconnect power from/to the solid state transformer 4, but can also keep the solid-state transformer 4 connected.

Thus some of the applications can be interconnected through LV SWG, and other ones can be fed through the SST. Thus the SST can be disconnected when not needed, but also kept connected if more power is needed According to an example, the solid-state transformer 4 is configured to provide galvanic insulation.

Thus, the solid-state transformer 4 is designed to be able to survive possible faults coming through the HV switchgear 3 from the HV or MV network 2, thus eliminating the need for any protection device within HV switchgear 3 or augmenting the protection within the HV switchgear 3.

According to an example, the medium frequency transformer 15 in each sub-module 13 is configured to provide galvanic insulation.

In an example, the solid state transformer can have an embedded monitoring and diagnostic system or features, in order to provide actual information of its health status. This can be provided by module or control system 8.

In an example, the solid state transformer has integrated protection and safety functions to protect itself as well as connected DC loads and applications. This can be provided by module or control system 8.

In an example, the solid state transformer in combination with a directly connected battery storage provides power back-up functionality for the other connected loads and applications.

According to an example, the system is configured to receive DC auxiliary power. The DC auxiliary power is provided by one or more of: an internal energy storage 20, an external energy generation device 102, and an external DC energy storage equipment 100.

According to an example, for the system to receive the DC auxiliary power the LV switchgear 5 is configured to connect to the external energy generation device 102 and/or to the external DC energy storage equipment 100.

In other words, an energy storage equipment 100 can be connected to one of the sub-modules 13 in the second module 12 of the solid-state transformer 4 either directly or through the LV switchgear 5.

According to an example, the system is configured to receive AC auxiliary power. The AC auxiliary power is provided by one or more of: a voltage transformer 21 located inside the HW switchgear, a voltage transformer 21 connected to the HV or MV network 2, a voltage transformer 21 connected to a nearby HV line 22, a nearby LV line 22, and an external AC energy generation device 102.

In an example, the AC auxiliary power is used by an AC auxiliary power supply 7.

According to an example, for the system to receive the AC auxiliary power the LV switchgear 5 is configured to connect to the external AC energy generation device 102.

According to an example, the system is configured to receive AC auxiliary power from an energy storage device 100 connected to the LV switchgear 5 or directly to a DC side of AC/DC converter 16 and its AC voltage being connected to a separate winding within one of the medium frequency transformers 15 for galvanic insulation.

According to an example, the system is configured to receive AC auxiliary power through specific winding of medium frequency transformer 15 connected to additional voltage transformer for further voltage scaling and/or frequency converter for frequency adaptation.

According to an example, the solid state transformer 4 further comprises a voltage transformer (21) powered from HV AC side and being used for AC auxiliary power supply (7).

Thus, a new system is provided of low voltage DC power conversion from the medium or high voltage AC network.

The new power conversion system can fulfill application requirements as well all aspects related to interconnection of LV DC with HV AC grid with a minimized footprint, enabling unidirectional as well as bi-directional power flow and easy operation and control of renewables into MV distribution networks.

The power conversion system is now described in specific detail, where again reference is made to FIGS. 2-5.

Figure 2:
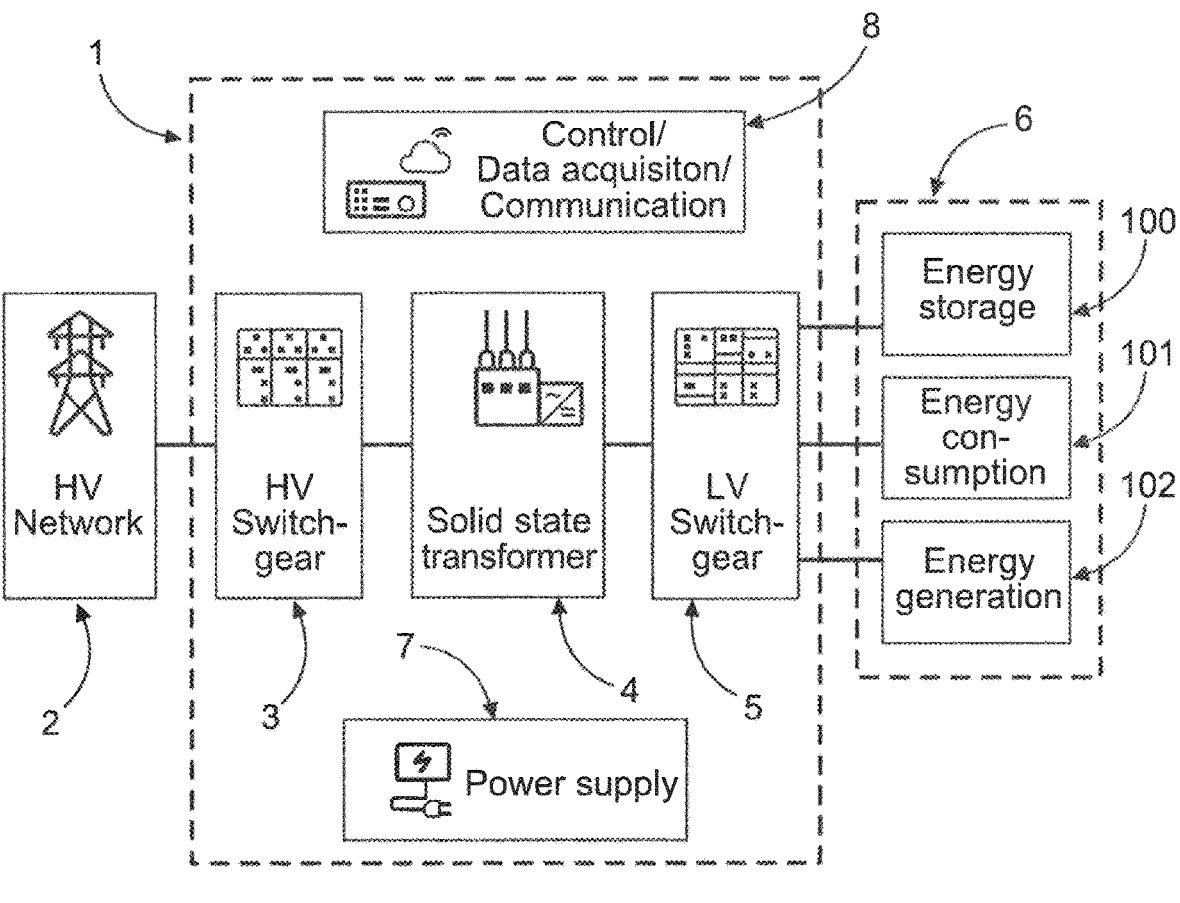
FIG. 2 is a schematic representation of a new power conversion system in accordance with the disclosure.

In FIG. 2, reference numerals are shown which represent the following:

1—AC/DC converter station/power conversion system
    2—HV or MV network
    3—HV switchgear (HV SWG)
    4—Solid state transformer (SST) providing galvanic insulation
    5—LV switchgear (LV SWG)
    6—Connected devices
    7—Auxiliary power supply for control circuits
    8—Overall control system with optional data acquisition and communication (to cloud)
    100—Energy storage equipment (e.g. battery storage or other)
    101—Energy consumption equipment (e.g. Datacenter, EV charging or other)
    102—Energy generation equipment (e.g. renewables=solar/wind power plant or other)

The power conversion system 1 shown in FIG. 2 can also be termed an AC/DC converter station 1 which is connected to a medium or high voltage AC network. A first part of the converter station (power conversion system) is a medium or high voltage (here generally termed HV) switchgear 3, that can connect to or disconnect from the HV or MV network by means of circuit breakers, disconnectors or switches that interrupt the main circuit. The HV switchgear 3 can also contain other protection or safety devices such as a surge arrester or earthing switch that can protect connected devices from excessive signals coming from the distribution network and/or protect personnel during required maintenance, repair, or service activities. A second part of AC/DC converter station 1 (power conversion system) is a solid-state power transformer (SST) 4. The SST 4 typically converts HV alternating current (AC) into a low voltage (LV) direct current (DC), involving galvanic insulation. Such output is then distributed inside of a LV switchgear 5 that distributes the output signal to various applications or connected devices 6 as well as providing necessary measurements, switching operations and safety features. The LV switchgear 5 can also interconnect various connected devices 6 together, creating a simple micro-grid, without involving the rest of the AC/DC converter station 1, e.g. a photovoltaic power plant 102 can be connected to supply power to an electric battery storage 100. The power plant 102 can supply either whole power required (if available), or at least a portion of that. In this case, only the remaining power required by an electric storage 100 could be supplied through the AC/DC converter station 1, thus eliminating power losses within energy conversion systems and increasing efficiency.

The AC/DC converter station 1 (power conversion system) further comprises an auxiliary power supply 7 for energizing the control devices within the whole or a part of the station 1. It can also be used to energize data acquisition devices as well as a control/communication infrastructure 8, thus enabling remote control of the substation that is otherwise not energized.

Figure 3:
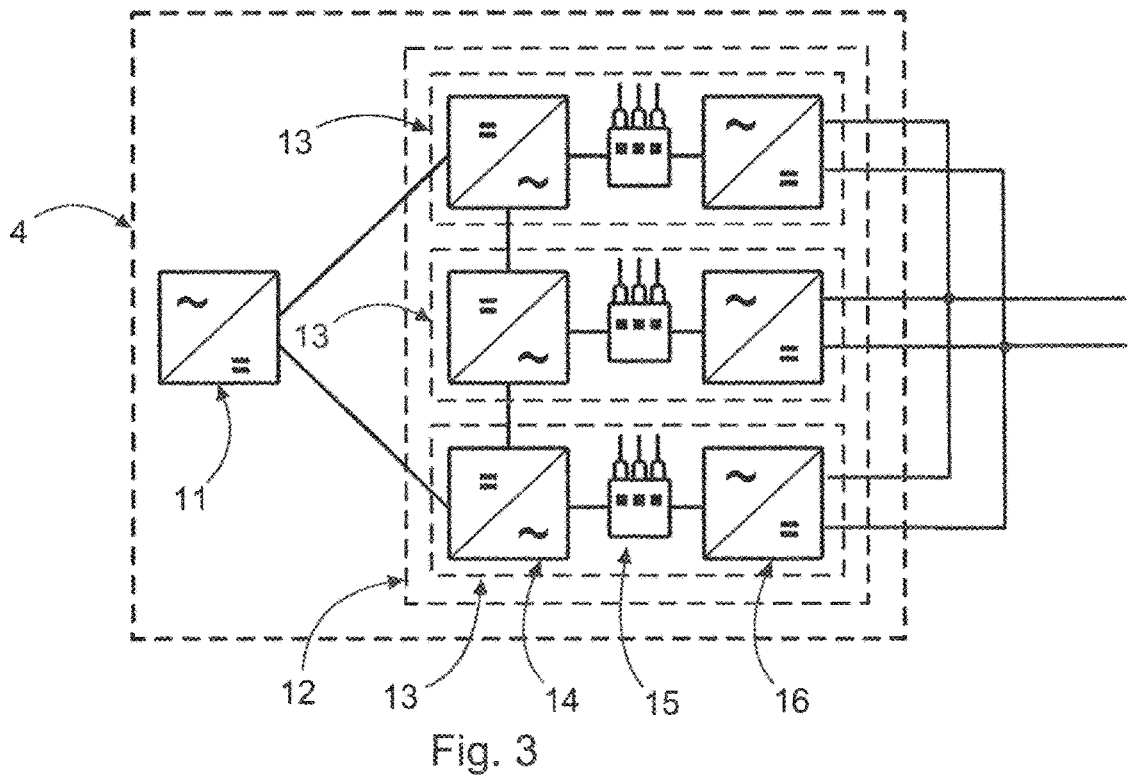
FIG. 3 shows a schematic representation of a solid-state transformer of a new power conversion system in accordance with the disclosure.

There exist several possible designs of what is called the "solid state transformer" (SST), but the topology described in FIG. 3 is especially beneficial for application in the AC/DC converter station (power conversion system), due to its small footprint and simple construction having significantly reduced number of components, thus improving reliability.

In FIG. 3, reference numerals are shown which represent the following:

4—Solid-state transformer (SST)
    11—First module (converts HV AC to HV DC signal)
    12—Second module (voltage scaling/transformation)
    13—Sub-module
    14—DC to AC converter (medium frequency)
    15—Medium frequency transformer (MFT)
    16—AC to DC converter (low voltage)

The solid state transformer 4 shown in FIG. 3 consists of two modules 11 and 12. The first module 11 converts typical HV AC signal into HV DC signal or backwards. The second module 12 consists of several, in series or parallel connected, sub-modules 13. Each submodule 13 converts a HV DC signal into a HV AC signal through a DC to AC converter 14, then provides galvanic insulation within a medium frequency transformer 15 and converts 16 the medium frequency AC signal into DC signal at a low voltage level. The output of all sub-modules 13 is connected either within the SST 4 and then goes into the LV switchgear 5, or connection of sub-modules 13 is done within the LV switchgear 5.

Figure 4:
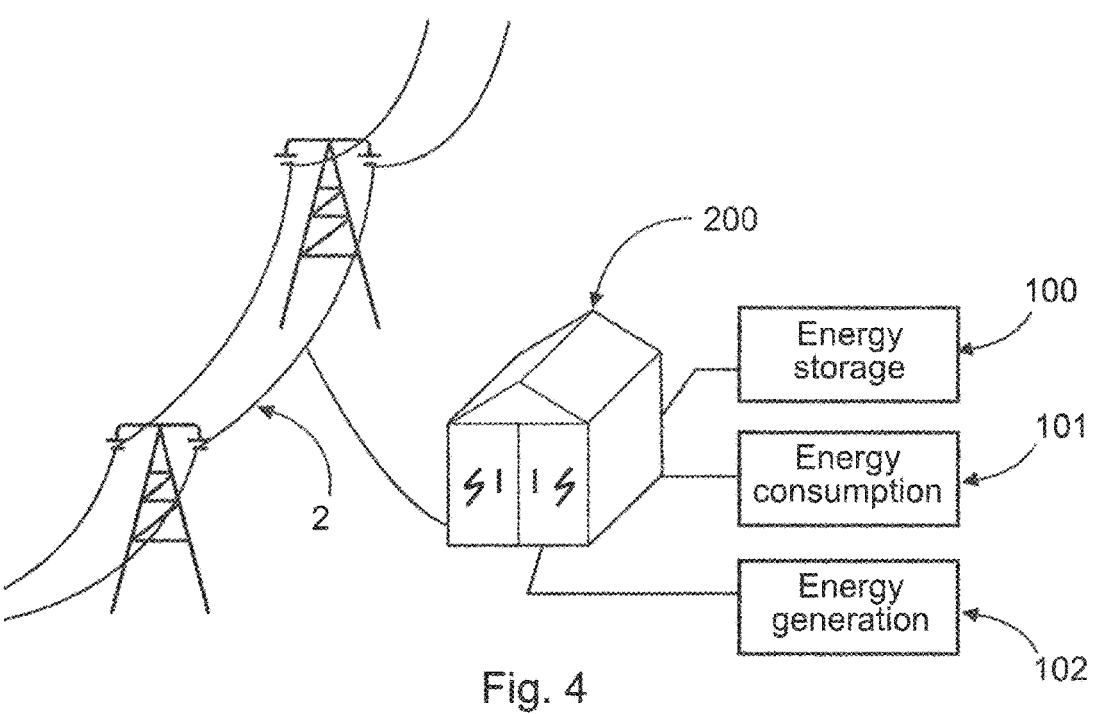
FIG. 4 shows a schematic representation of an architecture of a new power conversion system in accordance with the disclosure.

FIG. 4 shows schematics of system architecture, where the AC/DC converter station 1 (power conversion system) is enclosed by a housing 200 providing environmental protection as well as access to authorized personnel only.

Figure 5:
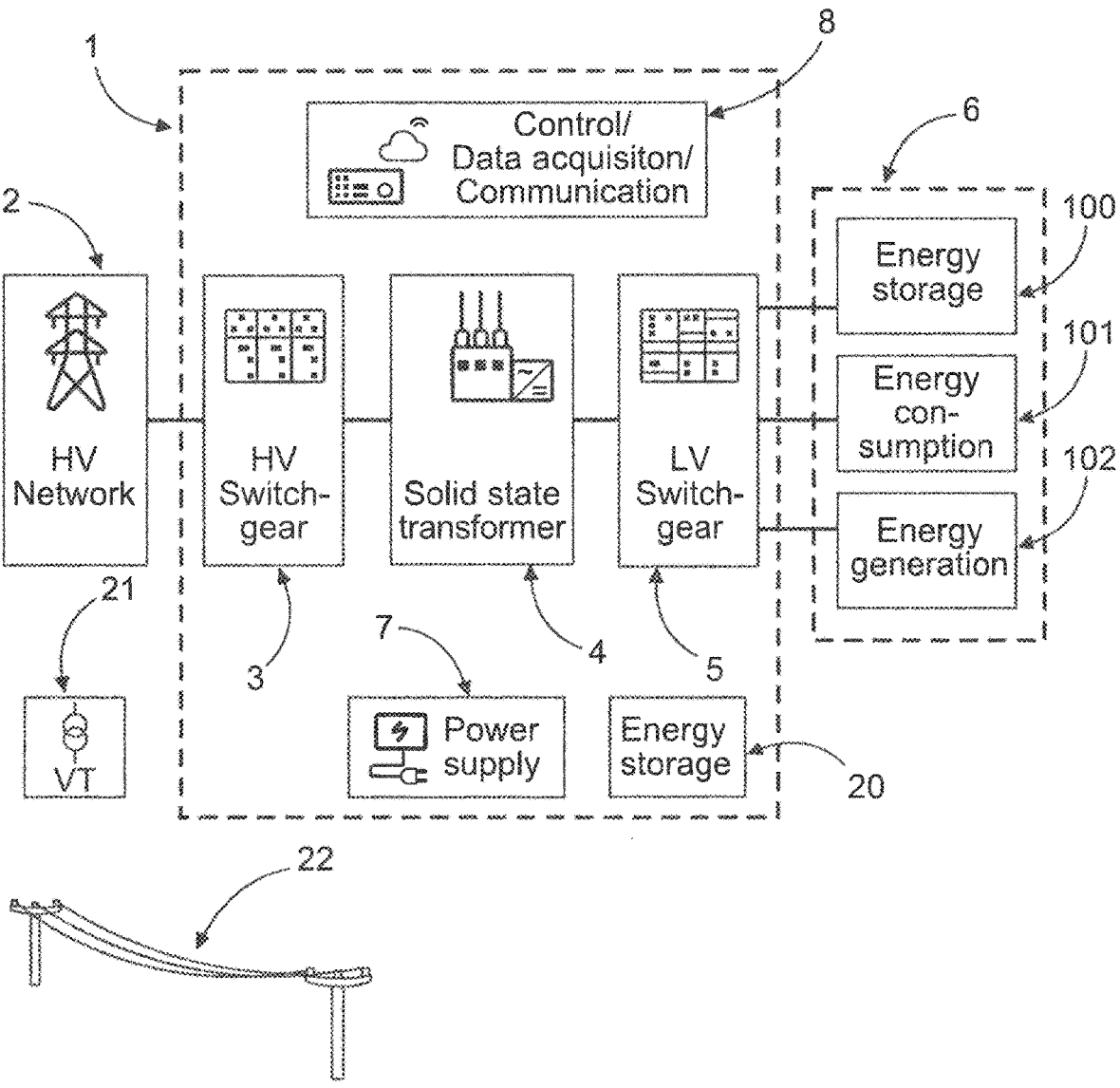
FIG. 5 shows a schematic representation of different auxiliary power supply architectures of a new power conversion system in accordance with the disclosure.

In FIG. 5, reference numerals are shown which represent the following:

20—internal storage device
    21—voltage transformer
    22—external power line FIG. 5 describes possible architectures for auxiliary power supply. Power supply can be required in the form of AC or DC signal, depending on habits or rules of a user. It may be needed in order to energize control/monitoring/communication equipment even without power flowing through the AC/DC converter station (power conversion system), so each part of the system could be operated remotely. Depending on whether AC or DC power supply is needed, there exists several possibilities for each option. The internal energy storage equipment 20, e.g. battery storage located within substation 1 (power conversion system), could be used to provide DC power as well as external energy storage 100. AC power can be supplied using a voltage transformer 21 that is connected to the HV line 2 outside of the substation 1 (power conversion system) or is located inside the HV switchgear 3. A voltage transformer 21 can also be instead connected to a nearby HV or MV line 22, to be independent from the HV line 2. AC auxiliary power supply can also be provided directly in case the nearby power line 22 is a LV line.

Thus in a detailed embodiment an AC/DC converter station 1, also termed a power conversion system, has a solid-state transformer 4. The solid-state transformer 4 is build out of several modules. A first module 11 of the SST 4 is for converting a HV AC signal into a HV DC signal and it is designed for maximum parameters of the solid state transformer 4. At least one second module 12 of the SST 4 is used for voltage scaling, comprising at least one sub-module 13 containing a DC/AC converter 14, medium frequency transformer 15 and AC/DC converter 16. The AC/DC converter station also has a high voltage switchgear 3 that is connected to the input of the solid-state transformer 4, with at least one switching and/or protection device. The AC/DC converter station also has a low voltage switchgear 5, connected to the output of the solid-state transformer 4, with plurality of switches, each connected to a different users or group of users or applications 6 or group of applications. The AC/DC converter station also has an overall control system 8 with data acquisition and communication, and an auxiliary power supply 7 for control and/or communication circuits.

In this detailed embodiment the solid-state transformer 4 is designed to be able to survive possible faulty signals coming through the HV switchgear 3 from the HV or MV distribution network 2, thus eliminating the need for any sophisticated protection device within HV switchgear 3.

The HV switchgear 3 can have at least one protection device that can prevent the faulty signals harming the solid-state transformer 4 or personnel.

The AC/DC converter station can have a housing enclosure within which the HV switchgear 3, the solid-state transformer 4, and the LV switchgear 5 are arranged.

The AC/DC converter station can have a housing enclosure within which at least the solid-state transformer 4 is arranged.

The AC/DC converter station can have or be able to connect to an energy storage equipment 100 connected to one or more of the sub-modules 13 in second module 12 of the solid-state transformer 4 either directly or through the LV switchgear 5.

The AC/DC converter station can have a HV switchgear 3 that itself has a voltage transformer 21 used for AC auxiliary power supply 7.

The AC/DC converter station can have an AC auxiliary power 7 supplied from an AC energy generation device 102.

The AC/DC converter station can have an AC auxiliary power 7 supplied from an energy storage device 100 connected to the LV switchgear 5 and/or directly to a DC side of AC/DC converter 16 and its AC voltage is then galvanically isolated using a separate winding within one of the medium frequency transformers 15. In the situation when DC auxiliary power is required, then the additional AC/DC converter can be connected to the separate winding of the medium frequency transformer 15.

The AC/DC converter station can have an AC auxiliary power supply 7 provided from independent LV AC grid 22.

The AC/DC converter station can have a DC auxiliary power supply 7 provided from connected DC energy storage equipment 100 or DC energy generation devices 102 or from an internal DC energy storage equipment 20.

The AC/DC converter station can have separation walls which provides at least two segregated compartments for different components of the AC/DC converter station 1. The AC/DC converter station can be a three-phase station.

The AC/DC converter station can be a three-phase station where the solid-state transformer 4 is built out of three single-phase units that can be operated independently.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, each sub-module (or the sub-module if there is only one) comprises a DC to AC converter, a medium frequency transformer and an AC to DC converter. The DC to AC converter is configured to convert the HV DC signal from the first module into a HV AC signal with higher frequency (typically within 300 Hz-3000 kHz) than the HV or MV frequency from the power network. The medium frequency transformer is configured to convert the HV AC signal from the DC to AC converter into a LV AC signal. The AC to DC converter is configured to convert the LV AC signal from the medium frequency transformer into the LV DC signal.

Thus, a relatively easy or simple design is provided with redundancy due to this modular structure, with means based on functional safety requirements such that the submodules can be arranged with redundancy in series or in parallel.

In an example, the second module comprises a plurality of sub-modules. The LV switchgear is configured to connect the LV DC signal from each sub-module to one or more of the plurality of applications or devices.

In an example, the second module comprises a plurality of sub-modules. The LV switchgear is configured to connect the LV DC signal from each sub-module to the plurality of applications or devices.

In an example, the HV switchgear comprises a plurality of protection or safety device configured to prevent excessive signals from the HV or MV network or fault signals from being exposed to the solid-state transformer or to personnel.

Thus, the HV switchgear comprises at least one protection device that can prevent the faulty signals harming the solid-state transformer or personnel.

In an example, the LV switchgear is configured to connect to two or more applications or devices of the plurality of applications or devices to connect the two or more applications or devices to each other.

In an example, the LV switchgear is configured to disconnect power from/to the solid-state transformer.

In an example, the LV switchgear is configured to connect the two or more applications or devices to each other.

Thus, the switchgear 5 can disconnect power from/to the solid state transformer 4, but can also keep the solid-state transformer 4 connected.

Thus some of the applications can be interconnected through LV SWG, and other ones can be fed through the SST. Thus the SST can be disconnected when not needed, but also kept connected if more power is needed In an example, the solid-state transformer is configured to provide galvanic insulation.

In an example, the medium frequency transformer in each sub-module is configured to provide galvanic insulation.

In an example, the solid state transformer can have an embedded monitoring and diagnostic system or features, in order to provide actual information of its health status.

In an example, the solid state transformer has integrated protection and safety functions to protect itself as well as connected DC loads and applications.

In an example, the solid state transformer in combination with a directly connected battery storage provides power back-up functionality for the other connected loads and applications.

Thus, the solid-state transformer is designed to be able to survive all possible faults coming through the HV switchgear from the HV or MV distribution network, thus eliminating the need for any protection device within HV switch-gear or augmenting the protection within the HV switchgear.

In an example, the system is configured to receive DC auxiliary power. The DC auxiliary power is provided by one or more of: an internal energy storage, an external energy generation device, an external DC energy storage equipment.

In an example, to receive the DC auxiliary power the LV switchgear is configured to connect to the external energy generation device and/or to the external DC energy storage equipment.

In other words, an energy storage equipment can be connected to one of the sub-modules in the second module of the solid-state transformer either directly or through the LV switchgear.

In an example, the system is configured to receive AC auxiliary power, wherein the AC auxiliary power is provided by one or more of: a voltage transformer located inside the HW switchgear, a voltage transformer connected to the HV or MV network, a voltage transformer connected to a nearby HV line, a nearby LV line, an external AC energy generation device.

In an example, to receive the AC auxiliary power the LV switchgear is configured to connect to the external AC energy generation device.

In an example, the system is configured to receive AC auxiliary power from an energy storage device connected to the LV switchgear or directly to a DC side of AC/DC converter and its AC voltage being connected to a separate winding within one of the medium frequency transformers for galvanic insulation.

In an example, the system is configured to receive AC auxiliary power through specific winding of medium frequency transformer connected to additional voltage transformer for further voltage scaling and/or frequency converter for frequency adaptation.

In an example, the solid state transformer further comprises a voltage transformer powered from HV AC side and being used for AC auxiliary power supply.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power conversion system, comprising:
a high voltage (HV) switchgear;
a solid-state transformer; and
a low voltage (LV) switchgear;
wherein the HV switchgear is configured to connect to a HV or a medium voltage (MV) network and disconnect from the HV or MV network;
wherein the HV switchgear is configured to connect to an input of the solid-state transformer;
wherein the solid-state transformer comprises a first module and a second module;
wherein the first module is configured to convert a HV alternating current (AC) signal into a HV direct current (DC) signal;
wherein the second module is configured to connect to an output of the first module and convert the HV DC signal from the first module into at least one LV DC signal;
wherein the second module comprises a plurality of sub-modules, wherein each sub-module comprises a DC to AC converter, a medium frequency transformer, and an AC to DC converter, wherein each DC to AC converter is configured to convert the HV DC signal from the first module into a HV AC signal, each medium frequency transformer is configured to convert the HV AC signal from the DC to AC converter into a LV AC signal, and each AC to DC converter is configured to convert the LV AC signal from the medium frequency transformer into the LV DC signal;
wherein the LV switchgear is configured to connect to an output of the solid-state transformer;
wherein the LV switchgear is configured to connect to a plurality of applications or devices and disconnect from the plurality of applications or devices, wherein the LV switchgear comprises a plurality of switches, and wherein each of the plurality of switches is connected to an application or device; and
wherein the LV switchgear is configured to connect the at least one LV DC signal from the second module to one or more of the plurality of applications or devices.

2. The power conversion system according to claim 1, wherein each sub-module comprises a DC to AC converter, a medium frequency transformer and an AC to DC converter, wherein the DC to AC converter is configured to convert the HV DC signal from the first module into an HV AC signal, wherein the medium frequency transformer is configured to convert the HV AC signal from the DC to AC converter into an LV AC signal, and wherein the AC to DC converter is configured to convert the LV AC signal from the medium frequency transformer into the LV DC signal.

3. The power conversion system according to claim 1, wherein the LV switchgear is configured to connect the LV DC signal from each sub-module to one or more of the plurality of applications or devices.

4. The power conversion system according to claim 1, and wherein the LV switchgear is configured to connect the LV DC signal from each sub-module to the plurality of applications or devices.

5. The power conversion system according to claim 1, wherein the HV switchgear comprises a plurality of protection or safety device configured to prevent excessive signals from the HV or MV network or fault signals from being exposed to the solid-state transformer or to personnel.

6. The power conversion system according to claim 1, wherein the LV switchgear is configured to connect to two or more applications or devices of the plurality of applications or devices to connect the two or more applications or devices to each other.

7. The power conversion system according to claim 6, wherein the LV switchgear is configured to disconnect power from/to the solid-state transformer.

8. The power conversion system according to claim 7, wherein the LV switchgear is configured to connect the two or more applications or devices to each other.

9. The power conversion system according to claim 1, wherein the solid-state transformer comprises an embedded monitoring and diagnostic system or features, in order to provide actual information of its health status.

10. The power conversion system according to claim 1, wherein the solid-state transformer comprises integrated protection and safety functions to protect itself as well as connected DC loads and applications.

11. The power conversion system according to claim 1, wherein the solid-state transformer in combination with a directly connected battery storage is configured to provide power back-up functionality for other connected loads and applications.

12. The power conversion system according to claim 1, wherein the system is configured to receive AC auxiliary power, wherein the AC auxiliary power is provided by one or more of: a voltage transformer located inside the HV switchgear, a voltage transformer connected to the HV or MV network, a voltage transformer connected to a nearby HV or MV line, a nearby LV line, an external AC energy generation device.

13. The power conversion system according to claim 1, wherein the system is configured to receive AC auxiliary power from an energy storage device connected to the LV switchgear or directly to a DC side of AC/DC converter and its AC voltage being connected to a separate winding within one of the medium frequency transformers for galvanic insulation.

14. The power conversion system according to claim 13, wherein the system is configured to receive AC auxiliary power through specific winding of medium frequency transformers connected to additional voltage transformers for further voltage scaling and/or frequency converter for frequency adaptation.

15. The power conversion system according to claim 1, wherein the solid-state transformer further comprises a voltage transformer powered from HV AC side and being used for AC auxiliary power supply.

16. The power conversion system according to claim 1, wherein the LV switchgear is configured to connect to an output of the at least one sub-module of the second module of the solid-state transformer.

17. The power conversion system according to claim 1, wherein the first module is configured to convert the high voltage alternating current HV AC signal from the high voltage or the medium voltage HV or MV network into the high voltage direct current HV DC signal.

* * * * *